United States Patent
Nakamura et al.

(10) Patent No.: US 6,783,173 B2
(45) Date of Patent: Aug. 31, 2004

(54) AIR CONDITIONING DUCT AND METHOD FOR MOUNTING SAME

(75) Inventors: Yasuhiko Nakamura, Saitama (JP); Jun Katakabe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/398,283

(22) PCT Filed: Oct. 11, 2001

(86) PCT No.: PCT/JP01/08919

§ 371 (c)(1),
(2), (4) Date: Jul. 31, 2003

(87) PCT Pub. No.: WO02/32702

PCT Pub. Date: Apr. 25, 2002

(65) Prior Publication Data

US 2004/0043719 A1 Mar. 4, 2004

(30) Foreign Application Priority Data

Oct. 18, 2000 (JP) ...................... 2000-318528

(51) Int. Cl.⁷ ............................... B60H 1/26
(52) U.S. Cl. ..................... 296/208; 454/121
(58) Field of Search ................. 454/121, 127; 296/70, 208

(56) References Cited

U.S. PATENT DOCUMENTS

| | | | |
|---|---|---|---|
| 3,382,791 A | | 5/1968 | Henry-Biabaud |
| 3,724,357 A | | 4/1973 | Kavthekar et al. |
| 4,223,754 A | * | 9/1980 | Mizuno et al. ............... 180/90 |
| 4,637,298 A | * | 1/1987 | Yoshikawa et al. ......... 454/127 |
| 6,273,495 B1 | * | 8/2001 | Haba et al. ............ 296/193.02 |
| 6,582,011 B2 | * | 6/2003 | Palazzolo et al. ........... 296/208 |
| 2002/0113453 A1 | * | 8/2002 | Takano et al. ................ 296/70 |

FOREIGN PATENT DOCUMENTS

| | | |
|---|---|---|
| DE | 42 32 847 A1 | 3/1994 |
| GB | 2 302 404 A | 1/1997 |
| JP | 11-321287 | 11/1999 |

* cited by examiner

*Primary Examiner*—Harold Joyce
(74) *Attorney, Agent, or Firm*—Armstrong, Kratz, Quintos, Hanson & Brooks, LLP (57) ABSTRACT

An air conditioning duct to be positioned on a rear surface of a vehicular instrument panel (10). The duct (20) allows an air conditioning duct with complicated share to be formed of a plurality of separate cylindrical members (30 to 60). Joining the plurality of cylindrical members with a plurality of fixture members (71) allows the air conditioning duct to be obtained. The cylindrical members have leg portions (39A to 39C, 45, 55, 65) designed to be mounted to the instrument panel.

6 Claims, 11 Drawing Sheets

AIR CONDITIONING DUCT AND METHOD FOR MOUNTING SAME

TECHNICAL FIELD

The present invention relates to an air conditioning duct to be positioned at a rear wall side of a vehicular instrument panel and a method for mounting the same.

BACKGROUND ART

In general vehicles including motor vehicles, there are many instances where the vehicles are mounted with air conditioning units with a view to provide a comfortable surrounding for passengers. A vehicular air conditioning system includes an air conditioning duct positioned at a rear side of an instrument panel mounted in a front part of a passenger compartment to allow cold air or hot air to be blown out into the passenger compartment through the duct. Such a duct is disclosed in, for example, Japanese Patent Laid-Open Publication No. HEI-11-321287.

The duct disclosed in Japanese Patent Laid-Open Publication No. HEI-11-321287 comprises a plurality of duct sections, interconnecting segments for interconnecting these duct sections and a leg portion protruding from one of the ducts, with the leg portion and the one of the duct sections being unitarily formed by a blow forming technology to form the air conditioning duct. Securing the aforementioned leg portion to the rear surface of the instrument panel 1 by vibration welding, hereinafter referred to as a vibrating deposition, allows the aforementioned air conditioning duct to be mounted to the instrument panel.

In order to improve the comfortable surrounding in the passenger compartment, it is desired for air conditioning to be efficiently carried out to preclude an uneven temperature distribution in the passenger compartment. To meet such a demand, it is a point that a plurality of air blowout openings must be located at respective suitable positions and the volumes of air discharged from the respective air blowout openings must be suitably distributed. In order to optimize the volumes of air to be distributed, it is thought that the air conditioning duct is formed with a plurality of partitions or with a plurality of air inlets. With such a structure, the air conditioning duct inevitably results in a complicated shape. When forming the air conditioning duct with such a complicated structure with the use of the abovementioned conventional technology, there is a limit in addressing issues of troublesome processing steps and complicated forming dies.

DISCLOSURE OF THE INVENTION

It is therefore an object of the present invention to provide a technology for enabling an air conditioning duct with a complicated structure, which is mounted to a vehicular instrument panel, to be manufactured in an easy manner.

According to a first aspect of the present invention, there is provided an air conditioning duct adapted to be located at a rear surface of a vehicular instrument panel, which comprises a first cylindrical duct, hereinafter referred to as a first cylindrical body; a second cylindrical duct, hereinafter referred to as a second cylindrical body, placed along the first cylindrical body; a plurality of fastener members, hereinafter referred to as fixture members, for joining the first and second cylindrical bodies to one another; and a leg portion extending from at least one of the first and second cylindrical bodies toward the vehicular instrument panel.

Thus, the present invention allows one piece of the air conditioning duct with a complicated structure to be manufactured with separate pieces of the cylindrical bodies. Joining these plural pieces of the cylindrical bodies with the plurality of the fixture members enables production of a single piece of the air conditioning duct. The unitarily formed air conditioning duct is mounted to the vehicular instrument panel via the leg portion extending toward the same. Thus, even when the air conditioning duct has the complicated structure, the presence of the plurality of the separate cylindrical bodies allows the individual cylindrical bodies to be formed in relatively simplified structures. This results in an easy production of the air conditioning duct.

Preferably, the fixture members are placed along the longitudinal direction of the first cylindrical body. Joining the first and second cylindrical bodies with the plurality of the fixture members allows the air conditioning duct to have an adequate entire shape and rigidity to provide a preferable result.

In a preferred form, at least one of the fixture members is located in the vicinity of the openings of the first and second cylindrical bodies. That is, the fixture member remains in the vicinity of the openings within worker's reach, with a resultant improvement over the joining workability.

Desirably, the first and second cylindrical bodies include air blowout tubes, respectively, which extend toward the aforementioned vehicular instrument panel. Outlets of the air blowout tubes are formed in bell-mouthed shapes so as to mate with the air discharge pipes mounted at the aforementioned vehicular instrument panel. Thus, even when the outlets of the air blowout tubes are slightly dislocated with respect to the air bleed openings of the instrument panel, mating the outlets of the air blowout tubes with the air discharge pipes enables a matching of the outlets of the air blowout tubes with respect to the air discharge pipes in an easy manner.

The leg portion may be designed to be mounted to the vehicular instrument panel by the vibrating deposition and has a mount surface formed with a plurality of projections. Thus, the presence of the plurality of the projections allows a contact surface area per each projection to have a lower value than that of a single piece of projection as proposed in prior art practice. The presence of the individual projections with reduced contact surface areas decreases the heat value, which occurs during the vibrating deposition, by an amount equal to the reduced contact surface area. It is possible to further preclude a sink mark or irregular gloss caused on an external surface of the instrument panel due to heat generated during the vibrating deposition.

According to a second aspect of the present invention, there is provided a method for mounting an air conditioning duct, comprising the steps of: preparing a first cylindrical body and a second cylindrical body which are unitarily formed with leg portions, respectively; placing the first cylindrical body and the second cylindrical body along to one another and joining the first and second cylindrical bodies with a plurality of fixture members; and mounting the respective leg portions to the vehicular instrument panel by a vibrating deposition.

Thus, in accordance with the assembling method of the present invention, the second cylindrical body is placed along the first cylindrical body and both of these components are joined to one another with the plural pieces of the fixture members and, subsequently, the leg portion is mounted to the instrument panel by the vibrating deposition, resulting in an ease of fabrication of the air conditioning duct even with a complicated structure. In addition, since the unitarily formed air conditioning duct is mounted to the instrument panel with a work merely having the vibrating deposition, workability for mounting the air conditioning duct is highly improved.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

The following description is merely exemplary in nature and is in no way intended to limit the invention, its application or uses.

Figure 1:
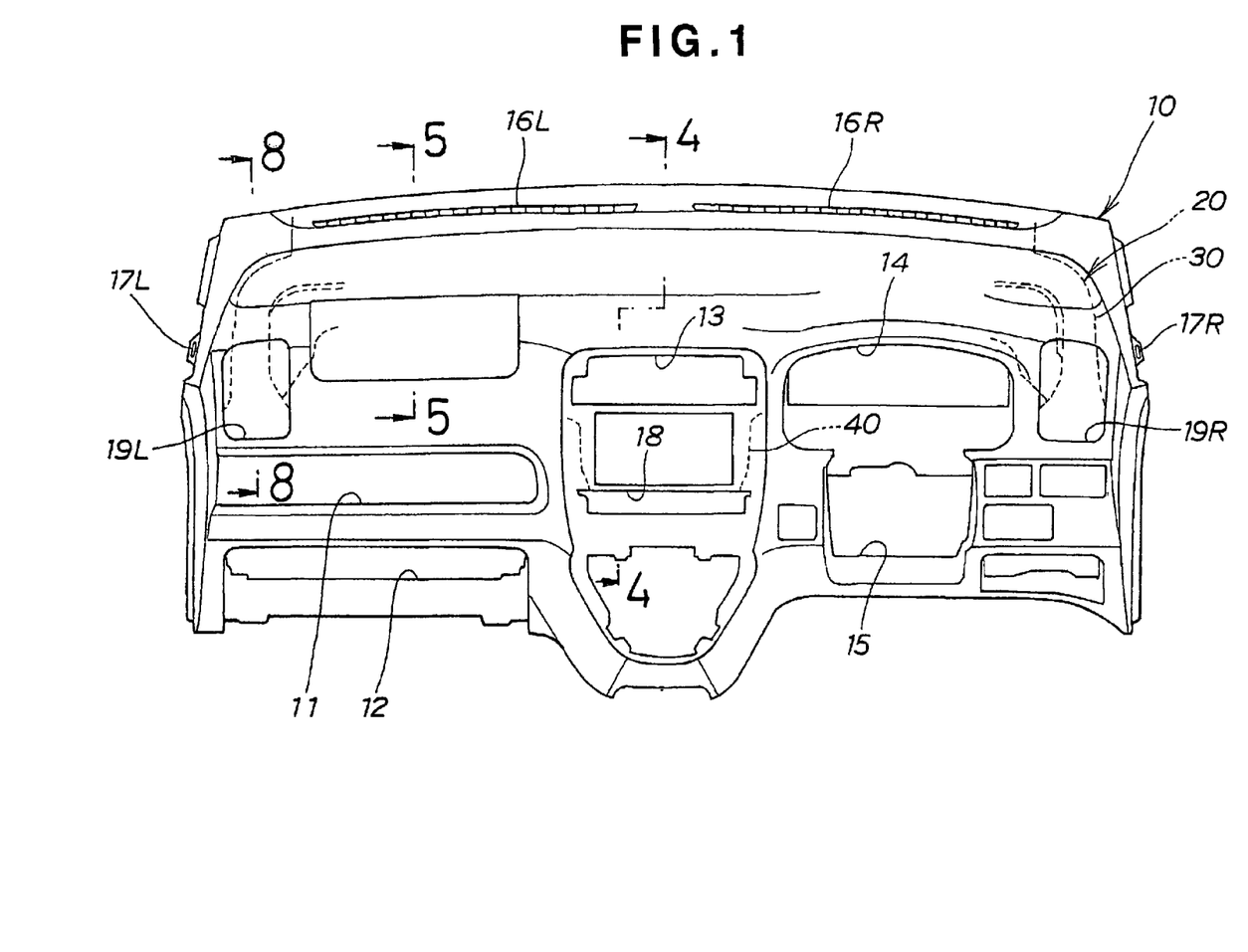
FIG. 1 is a front view illustrating a vehicular instrument panel.

FIG. 1 illustrates an automotive instrument panel 10 as seen from a vehicle occupant. The automotive instrument panel 10 is composed of a panel made of plastic resin to be mounted to a front portion of a vehicle compartment which is not shown and includes, in a frontal view (as viewed from a front portion of the drawing), a glove-box recessed portion 11 formed at a left and lower side, a glove- compartment mount opening 12 formed below the glove box recessed portion 11, an instrument mount opening 13 formed at a central area in a widthwise direction of a vehicle, an instrument mount opening 14 formed at a right and upper side, a steering shaft receiving opening 15 formed at a right and lower side, right and left front defroster blowout openings 16L, 16R, right and left side defroster blowout openings 17L, 17R, a central defroster blowout opening 18, and right and left ventilating terminal blowout openings 19L, 19R.

Figure 2:
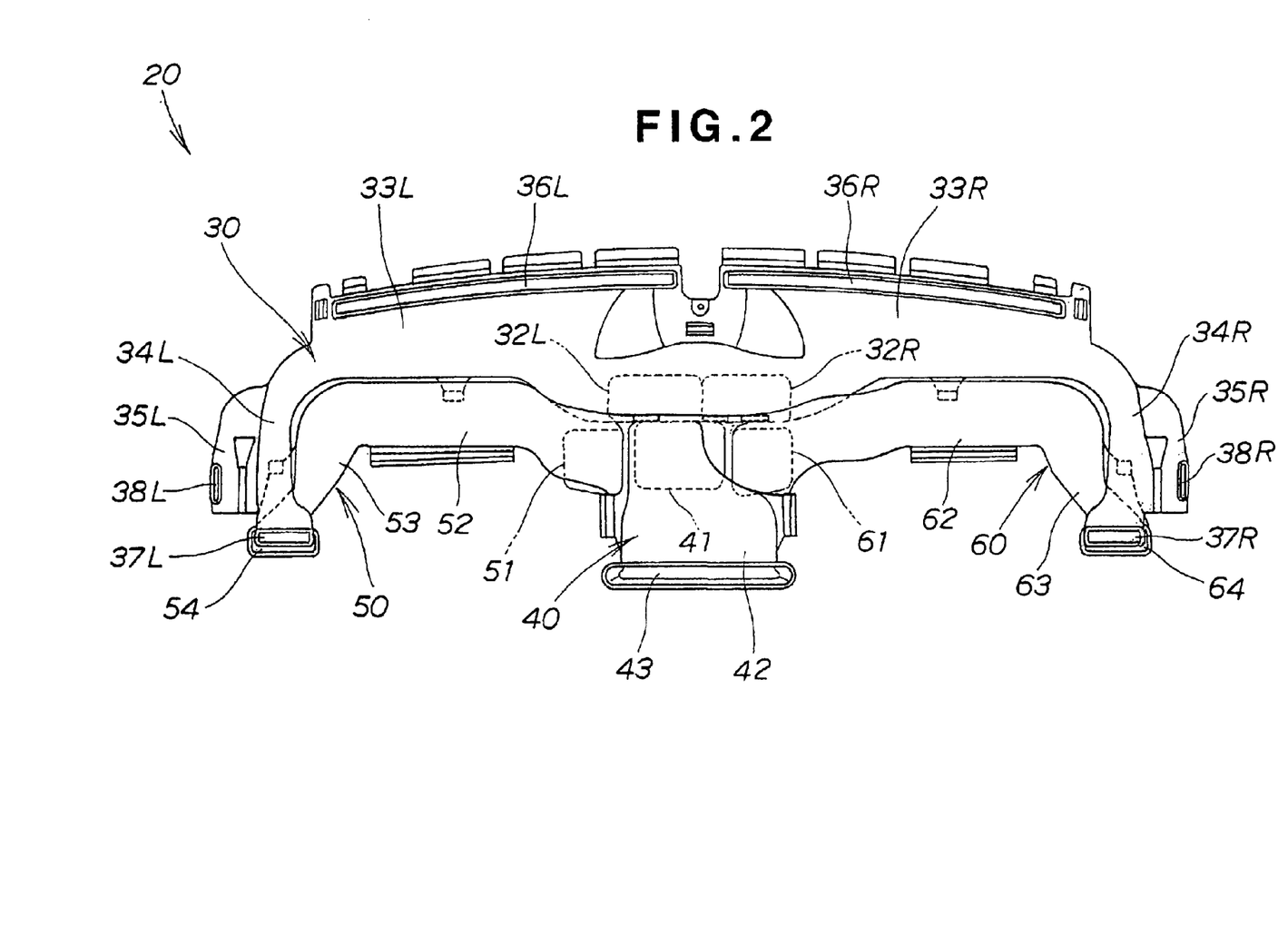
FIG. 2 is a front view of an air conditioning duct according to the present invention.
Figure 3:
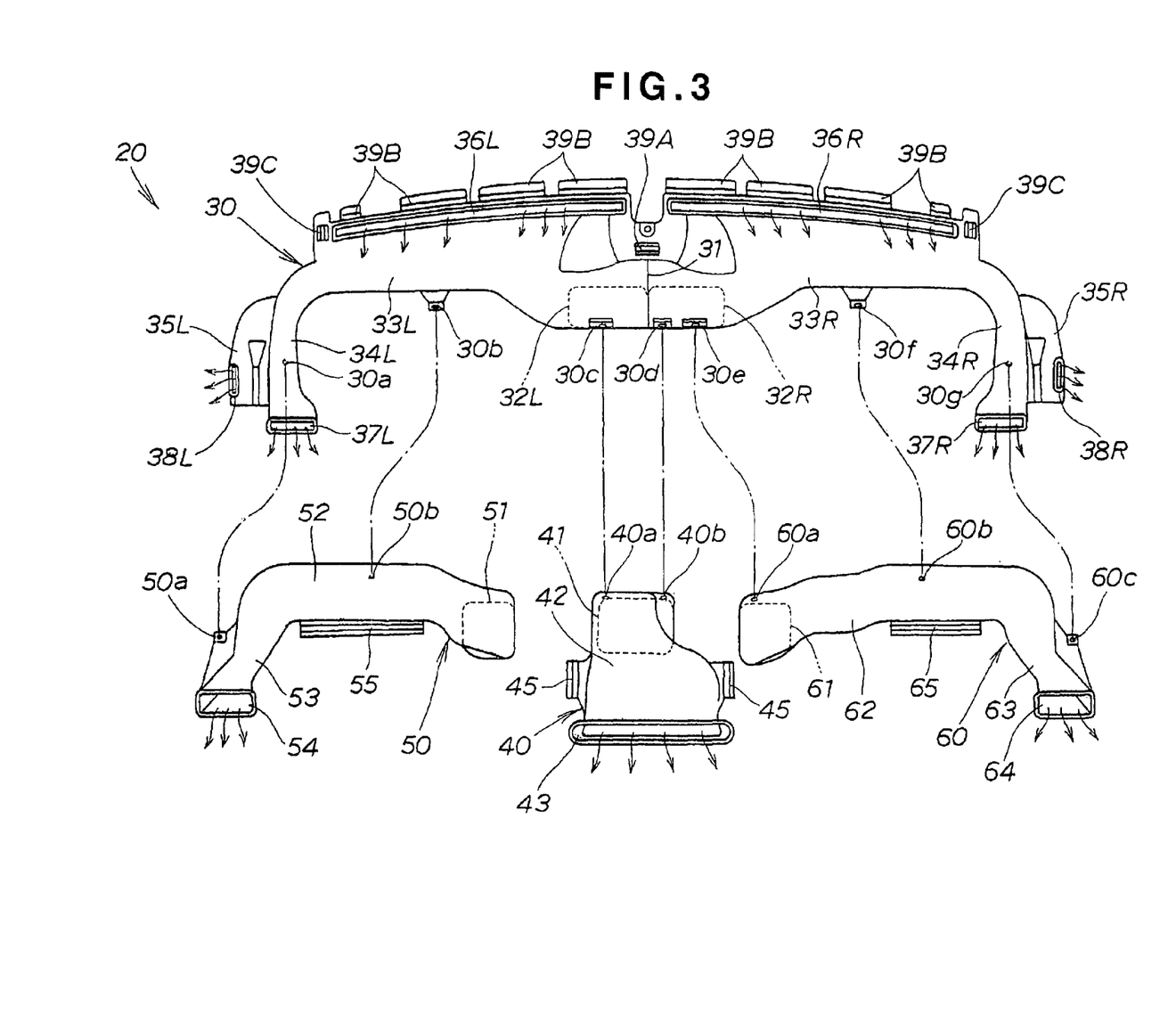
FIG. 3 is an exploded view of the air conditioning duct shown in FIG. 2.

FIGS. 2 and 3 show an air conditioning duct 20 as viewed form the vehicle passenger. The air conditioning duct 20 serves to introduce cool air or hot air into the vehicle compartment from an air conditioning unit which is not shown. The duct 20 includes an elongated cylindrical defroster member 30 which extends horizontally in the widthwise direction of the vehicle, a central cylindrical ventilating member 40 located at a central area in the widthwise direction of the cylindrical defroster member 30, a left side cylindrical ventilating member 50 located below the cylindrical defroster member 30 at a left side of the cylindrical ventilating member 40, and a right cylindrical ventilating member 60 located below the cylindrical ventilating member 30 at a right side of the central cylindrical ventilating member 40.

The central ventilating member 40, the left cylindrical ventilating member 50 and the right cylindrical ventilating member 60 are located along the cylindrical defroster member 30. In the present invention, the cylindrical defroster member 30 is referred to as "a first cylindrical body", and the central ventilating member 40 and the right and left cylindrical ventilating members, which are connected o the cylindrical ventilating member 30, are referred to as a "second cylindrical body".

Air ports 32L, 32R, 41,51,61 of the respective cylindrical members 30 to 60 are collectively located in a central area to be adjacent one other. These air ports 32L, 32R, 41, 51, 61 are coupled to air outlets of the air conditioning unit which is not shown. The air ports 32L, 32R, 41, 51, 61 serve as respective openings facing in a front direction of a vehicle body.

As shown in FIG. 3, the cylindrical defroster member 30 has a substantially bilateral symmetric configuration in structure. The cylindrical member 30 is constructed of a unitarily formed product, shaped by a blow forming, which has a partition wall 31 located at a center in the widthwise direction for bisecting the cylindrical member 30 into left and right side components, air inlets 32L, 32R located at left and right sides of the partition wall 31, a left horizontal section 33L communicating with the left air inlet 32L and extending leftward, a left suspended section 34L extending downward from a left distal end of the horizontal section 33L, a left defroster branch segment 35L branched off leftward from a left side of the left suspended section 34L, a right horizontal section 33R communicating with the right air inlet 32R and extending rightward, a right suspended section 34R extending downward from a right distal end of the horizontal section 33R, and a right defroster branch segment 35R branched off rightward from a right side of the right suspended section 34R.

Further, the cylindrical defroster member 30 has blowout openings 36L, 36R which open in substantially entire parts of front surfaces (at a planar side of FIG. 3 and will be hereinafter referred to in the same manner) of the left and right horizontal sections 33L, 33R, left and right blowout openings 37L, 37R opening toward the front of the vehicle compartment at lower distal ends of the left and right suspended sections 34L, 34R, respectively, and left and right blowout openings 38L, 38R opening toward the front of the vehicle compartment at lower ends of the left and right defroster branch segments 35L, 35R, respectively.

The central cylindrical ventilating member 40 is constructed of a unitarily formed product, shaped by a blow forming, which has an air inlet 41, a cylindrical body 42 communicating with the air inlet 41, and a blowout opening 43 opening toward the front of the vehicle compartment at a lower distal end of the cylindrical body 42.

The left cylindrical ventilating member 50 is constructed of a unitarily formed product, shaped by a blow forming, which has an air inlet 51, a left horizontal section 52 communicating with the air inlet 51 and extending leftward, a left suspended section 53 extending downward from a left distal end of the left horizontal section 52, and a blowout opening 54 opening toward the front of the vehicle compartment at a lower distal end of the left suspended section 53.

The right cylindrical ventilating member 60 is constructed of a unitarily formed product, shaped by a blow forming, which has an air inlet 61, a right horizontal section 62 communicating with the air inlet 61 and extending rightward, a right suspended section 63 extending downward from a right distal end of the right horizontal section 62, and a blowout opening 64 opening toward the front of the vehicle compartment at a lower distal end of the right suspended section 63.

The respective blowout openings of the air conditioning duct 20 and the respective blowout openings of the instrument panel 10 shown in FIG. 1 are correlated in a manner as described below.

(1) The blowout openings 36L, 36R, which are formed in the left and right horizontal sections 33L, 33R of the cylindrical defroster member 30, are connected to the front defroster blowout openings 16L, 16R shown in FIG. 1.

(2) The blowout openings 38L, 38R, which are formed in the left and right suspended sections 34L, 34R of the cylindrical defroster member 30, are connected to the terminal defroster blowout openings 19L, 19R.

(3) The blowout openings 38L, 38R, which are formed in the left and right defroster branch sections 35L, 35R of the cylindrical defroster member 30, are connected to the side defroster blowout openings 17L, 17R.

(4) The blowout opening 43, which is formed in the central cylindrical defroster member 40, is connected to the central ventilating blowout opening 18.

(5) The blowout openings 54, 64 of the left and right cylindrical ventilating members 50, 60 are connected to the terminal ventilating blowout openings 19L, 19R.

The cylindrical defroster member 30 has a plurality of connecting portions, hereinafter referred to as fixture segments, 30a to 30g which are formed in the left and right horizontal sections 33L, 33R and the left and right suspended sections 34L, 34R. These fixture segments 30a to 30g are formed along an elongated direction of the cylindrical defroster member 30.

The central cylindrical ventilating member 40 has a plurality of fixture segments 40a, 40b. These fixture segments 40a, 40b are coupled to the aforementioned fixture segments 30c, 30d of the cylindrical defroster member 30.

The left cylindrical ventilating member 50 has a plurality of fixture segments 50a, 50b. These fixture segments 50a, 50b are coupled to the aforementioned fixture segments 30a, 30b of the cylindrical defroster member 30.

The right cylindrical ventilating member 60 has a plurality of fixture segments 60a, 60b, 60c. These fixture segments 60a, 60b, 60c are coupled to the aforementioned fixture segments 30e, 30f, 30g of the cylindrical defroster member 30.

The air conditioning duct 20 has a plurality of leg portions 39A, 39B, 39C formed on upper parts of the cylindrical defroster member 30. Left and right sides of the central cylindrical ventilating member 40 are formed with leg portions 45, 45, respectively. The left horizontal section 52 of the left cylindrical ventilating member 50 is formed with a leg portion 55. The right horizontal section 62 of the right cylindrical ventilating member 60 is formed with a leg portion 65. These leg portions 39A, 39B, 39C, 45, 45, 55, 65 are mounted to the instrument panel 10 shown in FIG. 1.

By coupling the fixture segments 30a to 30g of the cylindrical defroster member 30 and the fixture segments 40a, 40b, 50a, 50b, 60a to 60c of the other cylindrical members 40 to 60 to a fixture member 71 which is described below, the individually formed cylindrical members 30 to 60 are mutually united to one another to assemble the air conditioning duct 20 in a unitary structure.

Thus, by coupling the plural cylindrical members 30 to 60 together, the air conditioning duct 20 is maintained in an entire structure, ensuring an entire rigidity of the air conditioning duct 20.

Also, the presence of the plurality of the fixture segments 30a to 30g formed along the longitudinal direction of the cylindrical defroster member 30 to be coupled to the fixture member 71 which is described below enhances the entire shape of the air conditioning duct 20 as compared to a structure wherein other cylindrical members 40 to 60 are coupled to the cylindrical member 30 by means of single pieces of the fixture members 71, respectively, ensuring an adequate degree of rigidity in the entire structure of the air conditioning duct 20.

The plurality of the leg portions 39A, 39B, 39C, 45, 45, 55, 65 of the uniformly configured air conditioning duct 20 can be mounted to the instrument panel 10 in an easy manner. Further, the presence of the air conditioning duct 20, with a high rigidity in structure, mounted to the instrument panel 10 leads to an increased rigidity in the instrument panel 10.

Figure 4:
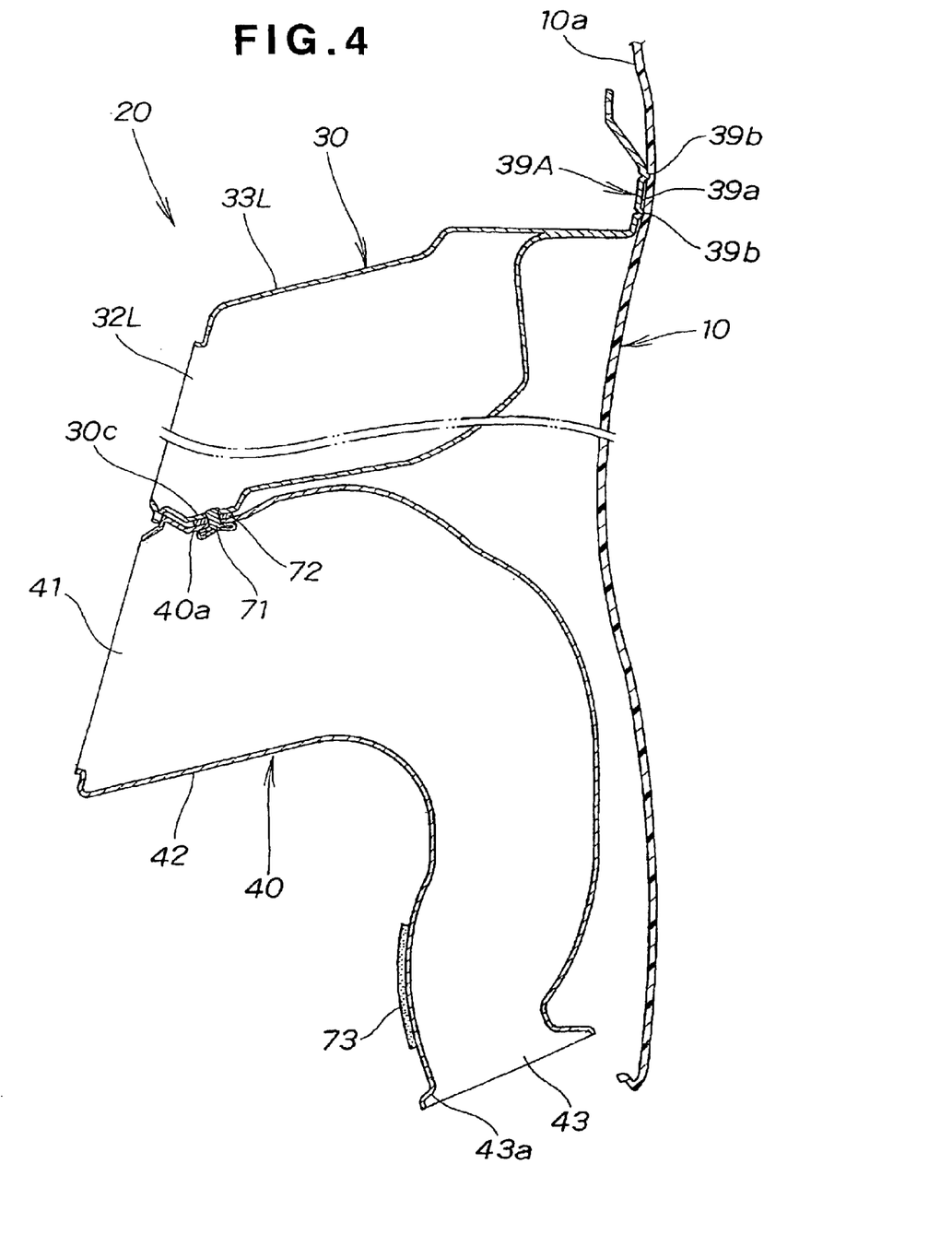
FIG. 4 is a cross-sectional view taken along line 4—4 of FIG. 1.

FIG. 4 shows a structure wherein the cylindrical body 42 of the central ventilating member 40 is joined to the left horizontal section 33L of the cylindrical defroster member 30.

The cylindrical defroster member 30 has a flat fixture segment 30c formed at a bottom in the vicinity of the air inlet 32L. The central ventilating member 40 has a flat fixture segment 40a formed in a ceiling in the vicinity of the air inlet 41. The fixture segments 30c and 40a are overlapped and coupled to one another by the fixture member 71 composed of a rivet, thereby coupling the cylindrical members 30 and 40 to one another. Thus, the presence of the coupling portions formed at areas in the vicinity of the air inlets (openings) 32L, 41 provides an ease of handling to the coupling portions, thereby improving coupling work for the mutual cylindrical members 30, 40.

A leg portion 39A, which extends near a rear surface 10a of the instrument panel 10, is formed in a unitary structure with the left horizontal section 33L and is fixedly secured to the rear surface 10a of the instrument panel 10 by a vibrating deposition technology. The leg portion 39A has a mount surface 39a formed with a plurality of projections 39b, 39b. These projections 39b, 39b are secured to the rear wall 10a by the vibrating deposition.

The blowout opening 43 of the central ventilating cylindrical member 40 serves as a part of an air blowout conduit which extends toward the instrument panel 10. The outlet 43a of the air blowout conduit is formed in a bell-mouthed shape. In the drawing, reference numeral 72 refers to a spacer and reference numeral 73 refers to a heat insulation material for precluding dew condensation.

Figure 5:
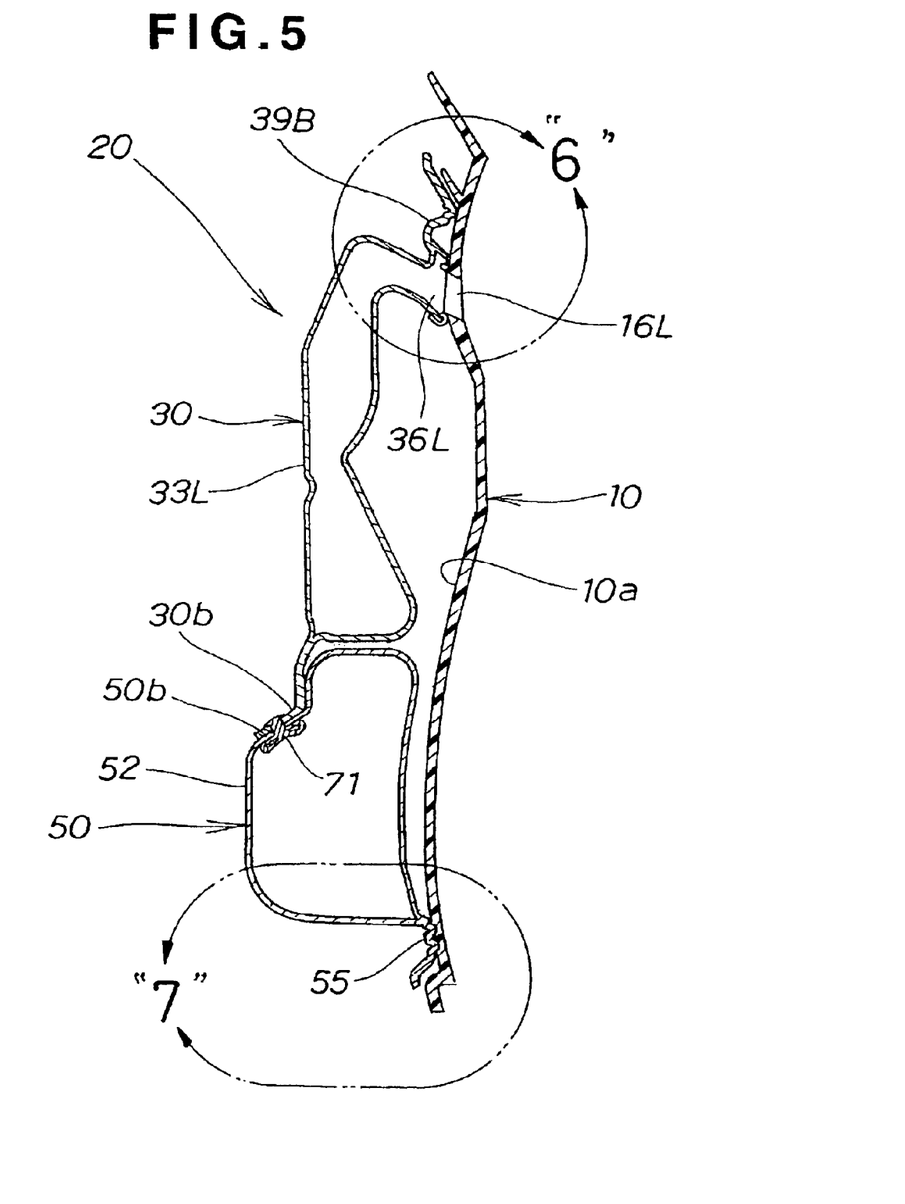
FIG. 5 is a cross-sectional view taken along line 5—5 of FIG. 1, illustrating a state in which a left horizontal section of a cylindrical defroster member is coupled to a left horizontal section of a left cylindrical ventilating member.

FIG. 5 shows a structure wherein the left horizontal section 52 of the left cylindrical ventilating member 50 is joined to the left horizontal section 33L of the cylindrical defroster member 30.

The cylindrical defroster member 30 has a front and lower portion formed with a tongue shaped fixture segment 30b. The left cylindrical ventilating member 50 has a front and upward portion formed with a flat fixture segment 50b. The fixture segments 30b and 50b are overlapped and coupled to one another by the fixture member 71 such that the cylindrical member 30 and the cylindrical member 50 are interconnected.

Figure 6:
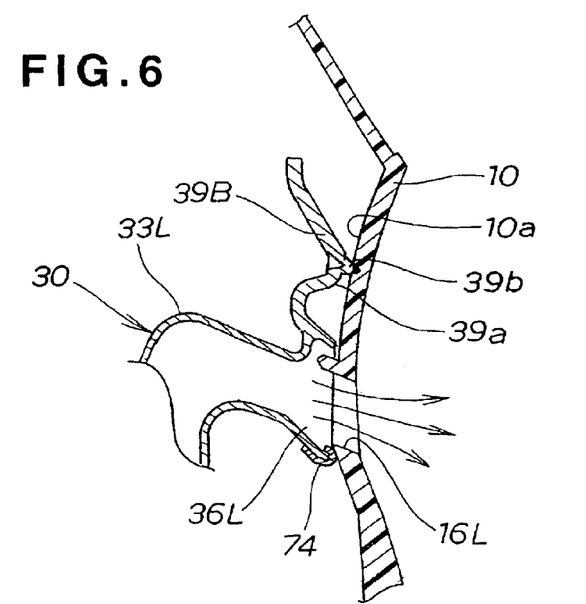
FIG. 6 is a detailed view of a section 6 of FIG. 5, illustrating a state in which a blowout opening of the left horizontal section of the cylindrical defroster member is coupled to a defroster blowout opening.

FIG. 6 shows a structure wherein the blowout opening 36L of the left horizontal section 33L of the cylindrical defroster member 30 is joined to the blowout opening 16L for the front defroster.

A resilient material 74 is interposed between the rear surface 10a of the instrument panel 10 and a peripheral part of the blowout opening 36L. The resilient material 74 prevents the peripheral part of the blowout opening from being brought into direct abutting engagement with the rear surface 10a due to vibrations, etc.

The cylindrical defroster member 30 has a leg portion 39B integrally formed with the left horizontal section 33L and extending toward the rear surface 10a of the instrument panel 10. The leg portion 39B has a mount surface 39a formed with a single piece of projection 39b for mounting the leg portion 39b onto the rear surface 10a of the instrument panel 10 by the vibration deposition technique. The projection 39b is partly joined to the rear surface 10a of the instrument panel 10 by he vibrating deposition.

Figure 7:
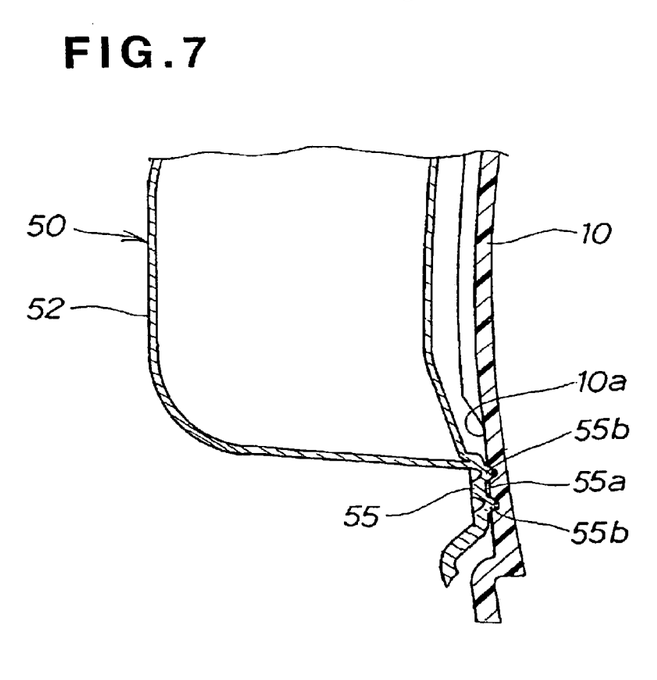
FIG. 7 is a detailed view of a section 7 of FIG. 5, illustrating a state in which the leg portion of the left cylindrical ventilating member is mounted to a rear surface of the instrument panel.

FIG. 7 shows a structure wherein the left cylindrical ventilating member 50 is mounted onto the instrument panel 10.

The left cylindrical ventilating member 50 has a leg portion 55 integrally formed with the left horizontal section 52 so as to extend toward the rear surface 10a of the instrument panel 10. The leg portion 55 has a mount surface 55a formed with a plurality of projections 55b, 55b with a view to enabling the leg portion 55 to be mounted onto the rear surface 10a of the instrument panel 10 by the vibrating deposition. These projections 55b, 55b are secured to the rear surface 10a of the instrument panel by the vibrating deposition. That is, when overlapping the mount surface 55a of the leg portion 55 over the rear surface 10a of the instrument panel 10 and holding an overlapped area with a press tool which is not shown with a view to implementing the vibrating deposition work, the plural (for example, two pieces) projections 55b, 55b are brought into contact with the rear surface 10a.

Other leg portions 39A, 45, 45, 65 shown in FIG. 3 have similar structures.

Conventionally, the leg portion 55 had the mount surface 55a formed with a single piece of projection. In contrast to a structure wherein a contact surface area is provided by the single piece of projection, an entire contact surface area of the plural projections 55b, 55b in the present invention may substantially have the same value as that of the single piece of projection. Thus, the contact surface area of each projection 55b is decreased by such an amount. To this end, for example, the projection 55b may have a reduced widthwise dimension. The presence of the individual projections 55b each with the reduced surface contact area enables a heat value, generated when executing the vibrating deposition, to be regulated by such amount. Consequently, it is possible to further reliably preclude the instrument panel 10 from being formed with a sink mark or an irregular gloss. In contrast, if each of the projections 55b in the present invention is designed to have the same contact surface area as that of the conventional projection, a total contact surface area of the plural projections 55b is increased to have a larger value than that of the conventional projection. With such an arrangement, a deposition surface area is increased, thereby enhancing a further sufficiently improved deposition with increased strength.

Figure 8:
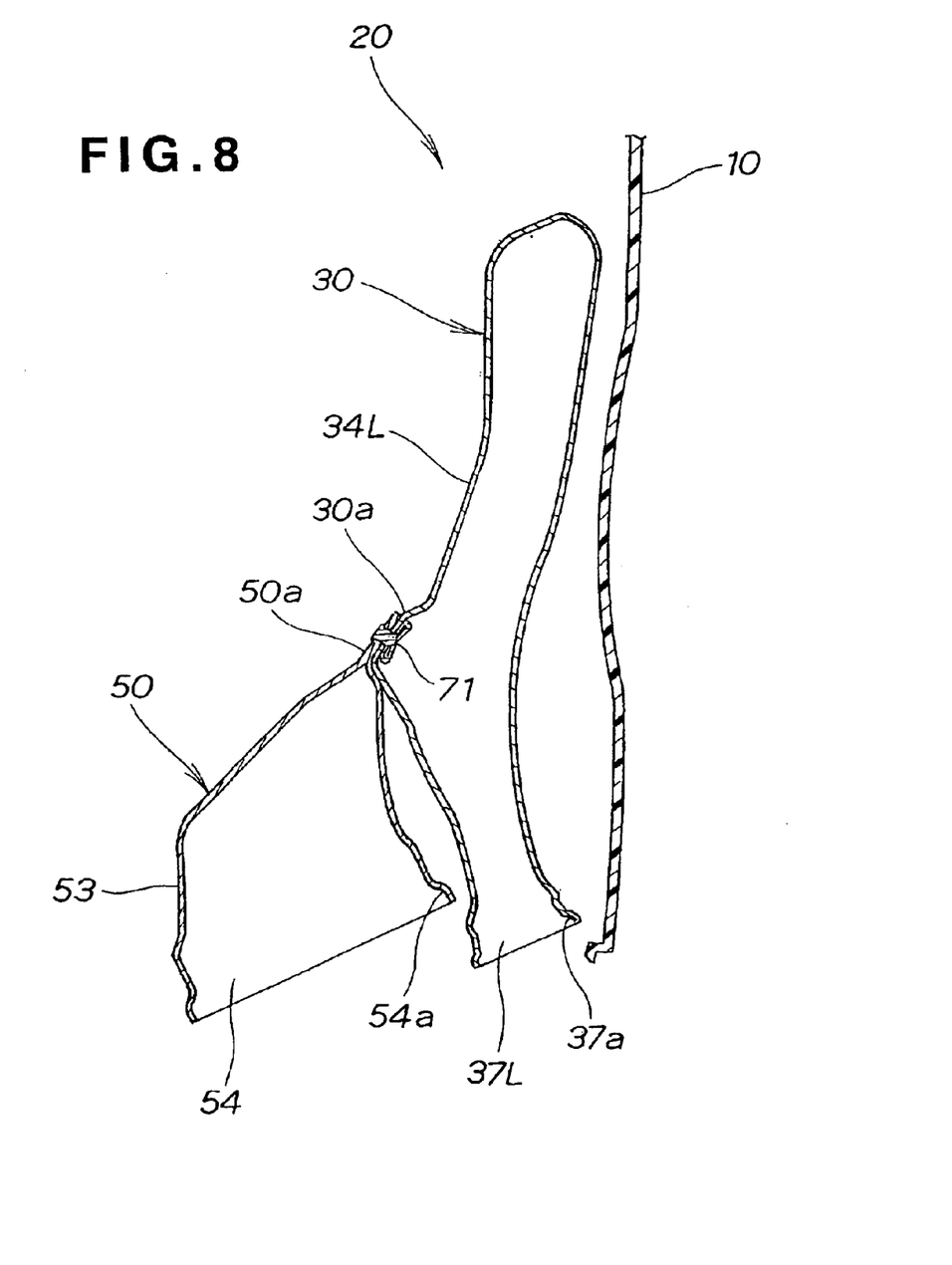
FIG. 8 is a cross-sectional view taken along line 8—8 of FIG. 1, illustrating a state in which a left suspended section of the left cylindrical ventilating member is coupled to a left suspended section of the cylindrical defroster member.

FIG. 8 shows a structure wherein the left suspended section of the left cylindrical ventilating member 50 is joined to the left suspended section 34L of the cylindrical defroster member 30.

The cylindrical defroster member 30 has the flat fixture segment 30a formed at a front portion of the left suspended section 34L. The left cylindrical ventilating member 50 has the tongue-shaped fixture segment 50a which extends upward from an upper corner of the left suspended section 53. The fixture segments 30a and 50a are overlapped and coupled together by means of the fixture member 71, thereby joining the cylindrical members 30 and 50 into one piece.

The blowout opening 37L of the cylindrical defroster member 30 and the blowout opening 54 of the left cylindrical ventilating member 50 serve as air blow out conduits which extends toward the instrument panel 10. The outlets 37a, 54a of these members are formed in a bell-mouthed shape.

Figure 9A:
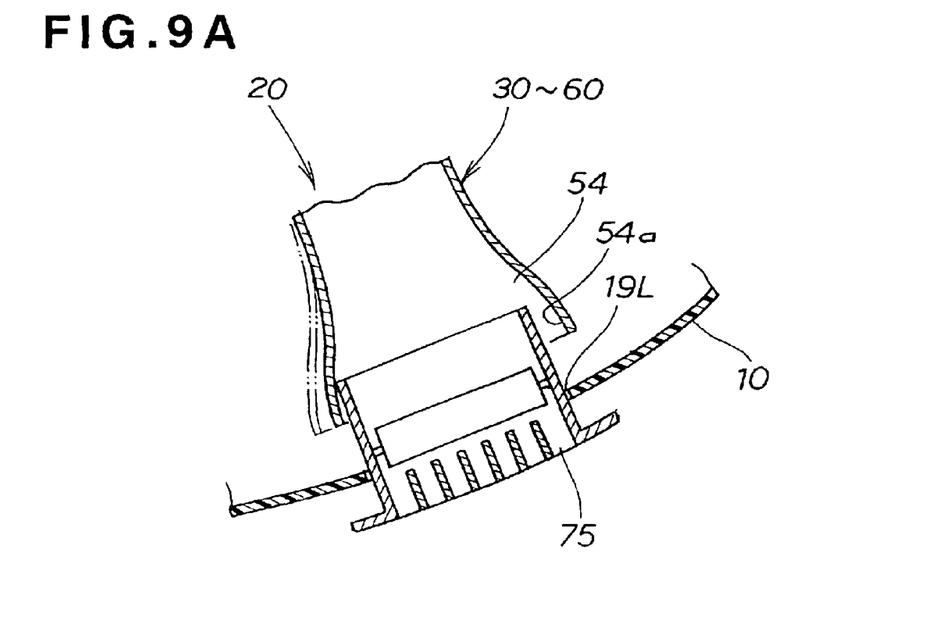
FIGS. 9A and 9B are views illustrating a relationship between an air blowout tube and an air discharge pipe.
Figure 9B:
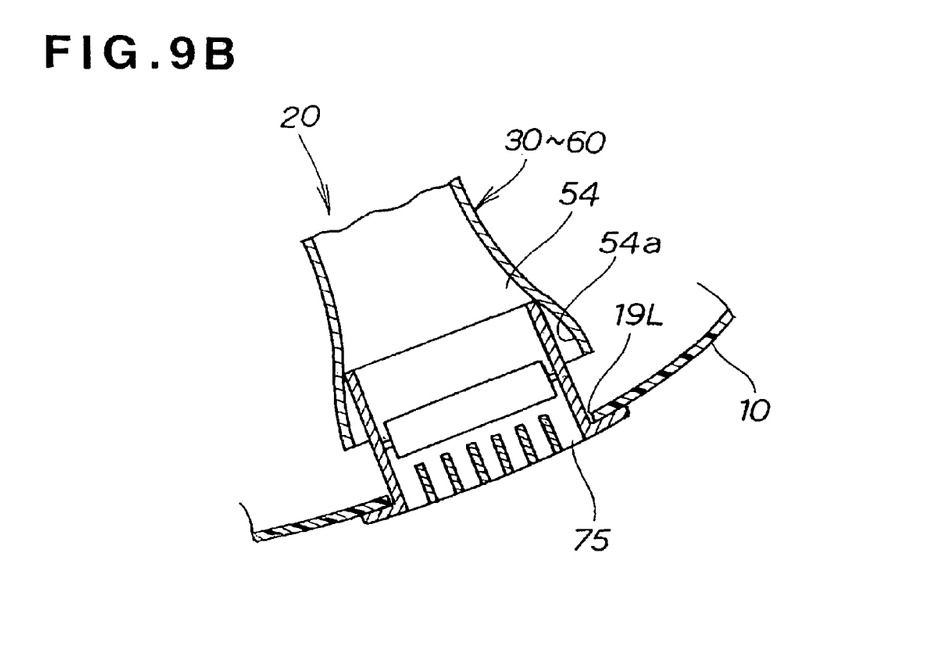

FIGS. 9A and 9B are views illustrating operations in the vicinity of the outlets of the air blowout conduits of the cylindrical members, respectively.

FIG. 9A shows a structure wherein an air discharge pipe 75 is located in the blowout opening (which is exemplified with respect to an example of the left terminal ventilating blowout opening 19L) of the instrument panel 10. The air bleed pipe (which is exemplified with respect to an example of the air blowout opening 54) extends from each of the cylindrical members 30 to 60 toward the instrument panel 10. The outlet 54a of the air blowout tube 54 has a bell-mouthed shape so as to mate with the aforementioned air discharge pipe 75 mounted at the instrument panel 10.

Assume that, in a state wherein the cylindrical members 30 to 60 are mounted to the instrument panel 10, the outlet 54a of the air blowout tube 54 is slightly dislocated from the blowout opening 19L due to mounting error of the air blowout tube 54. Since the outlet 54a of the air blowout tube 54 is not fixed to the instrument panel 10, the air blowout tube 54 is deformable due to own resilient deforming characteristic. Inserting the air discharge pipe 75 into the air bleed pipe 54 into the air blowout opening 19L after mounting each of the cylindrical members 30 to 60 to the instrument panel 10 enables the outlet 54a of the air blowout tube 54 to be mated with the air discharge pipe 75. As a result, the outlet 54a, which is slightly dislocated, is urged by the air discharge pipe 75 to be deformed. FIG. 9B shows a state wherein the air blowout tube 54 is aligned with the air discharge pipe 75.

The outlets of the other air bleed pipes (air blowout openings) 36L, 36R, 37L, 37R, 38L, 38R, 43, 64 are aligned in the same manner as previously noted.

Now, a sequence of method for fabricating and mounting the air conditioning duct 20 with the structure mentioned above is described with reference to FIGS. 10 and 11.

FIGS. 10A to 10D shows a fabricating sequence for the air conditioning duct. The air conditioning duct 20 is fabricated by a blow shaping technique.

Figure 10A:
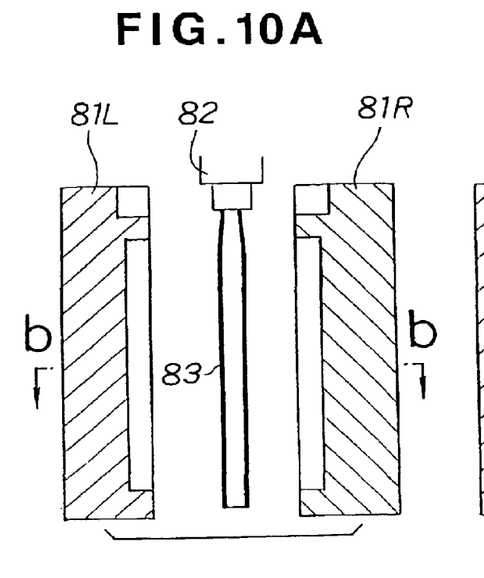
FIGS. 10A to 10D are views illustrating a sequence of manufacture of the air conditioning duct.
Figure 10B:
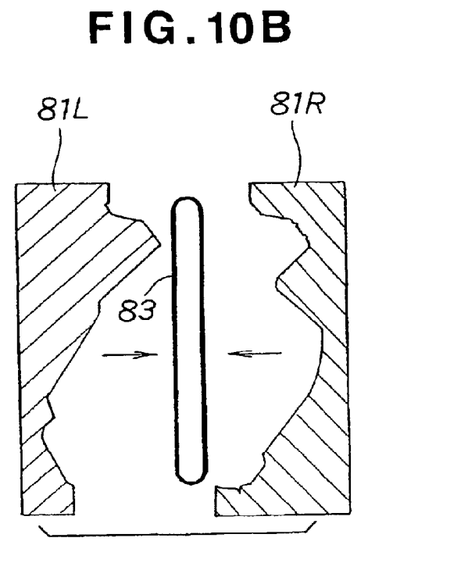

First, in FIGS. 10A and 10B, left and right forming dies 81L, 81R are held in an open state, and heated and melted resin is extruded in a tube shape from a die head 82 of an extruder which is not shown, thereby implementing a preliminary forming step. The tube-shaped resin is referred to as a parison 83. Subsequently, the left and right forming dies 81L, 81R are matched to sandwich the parison 83 in the melted state.

Figure 10C:
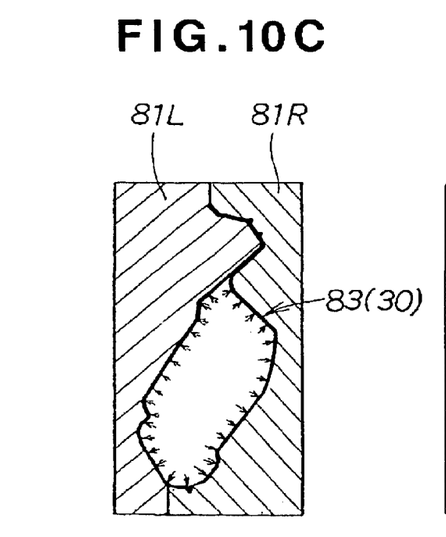

Next, in FIG. 10C, compressed air is blown into an internal part of the parison 83, thereby expanding the parison 83 along forming surfaces of the left and right forming dies 81L, 81R to form a product.

Figure 10D:
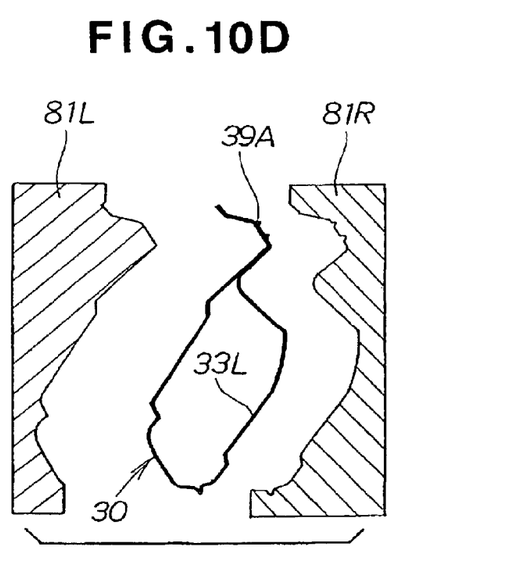

Lastly, in FIG. 10D, the left and right forming dies 81L, 81R are opened, allowing the solidified product, composed of the cylindrical member (for example, the cylindrical member 30), to be removed.

With such a sequence described above, the cylindrical member is fabricated by the blow forming technique. For example, since the cylindrical member, which has the leg portions, is formed by blow forming in a unitary structure, even if the cylindrical member has a large structure with a relatively complicated shape, the cylindrical member can be formed in an easy manner with an increased air tight relationship, resulting in a reduction in the number of component parts. As a consequence, it is possible for the cylindrical members to be reduced on manufacturing cost.

Now, a method for assembling the duct onto the instrument panel 10 is described below in detail in conjunction with FIGS. 11A to 11C.

Figure 11A:
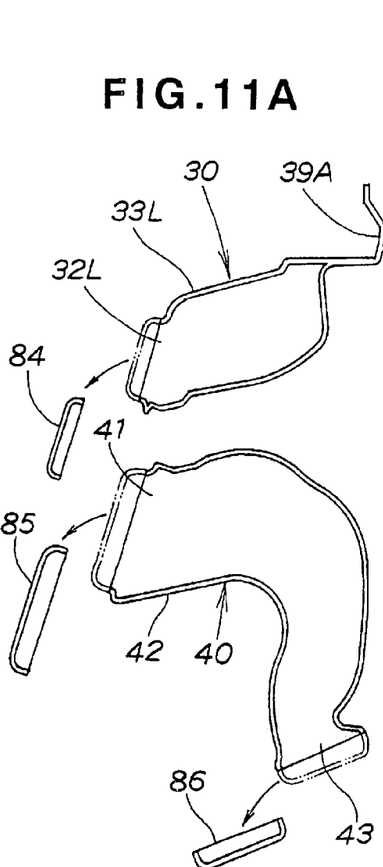
FIGS. 11A to 11C are views illustrating a sequence of assemblage of the air conditioning duct.

First, as shown in FIG. 11A, all the cylindrical members, which are shaped by blow forming in the forming method shown in FIGS. 10A to 10D, are prepared (in a first step). For example, the cylindrical defroster member 30 unitarily formed with the leg portion 39A in the forming method discussed above and the central cylindrical ventilating member 40 are prepared. When shaping the cylindrical members 30, 40 by blow forming, undesired parts 84 to 86 are formed during the forming step.

The aforementioned undesired parts 84 to 86 are cutout and removed, finishing the shapes of the cylindrical members 30, 40 (in a second step). For example, removing the undesired parts 84 to 86 allows the air inlets 32L, 41 and the air blowout opening 43 to be formed. Thus, it is easy for the undesired parts 84 to 86 to be removed to finish the shapes of the cylindrical members 30, 40.

Figure 11B:
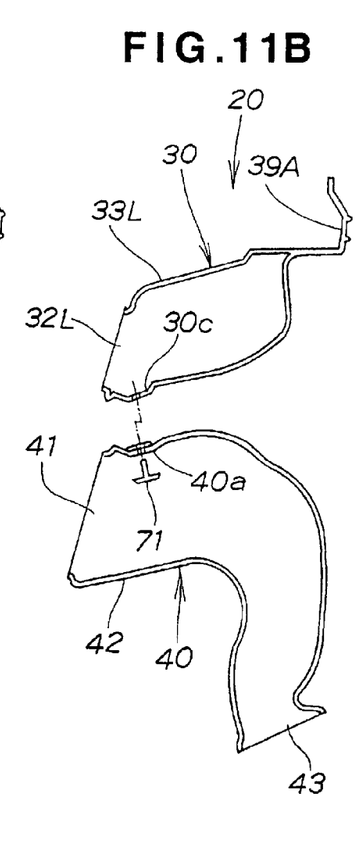

Next, as shown in FIG. 11B, the central cylindrical ventilating member 40 is mated with the cylindrical defroster member 30 and both of these component parts are joined together by the plurality of fixture members 71 (of which only one piece is shown in this drawing) (in a third step). In such a manner, the air conditioning duct 20 is obtained.

Figure 11C:
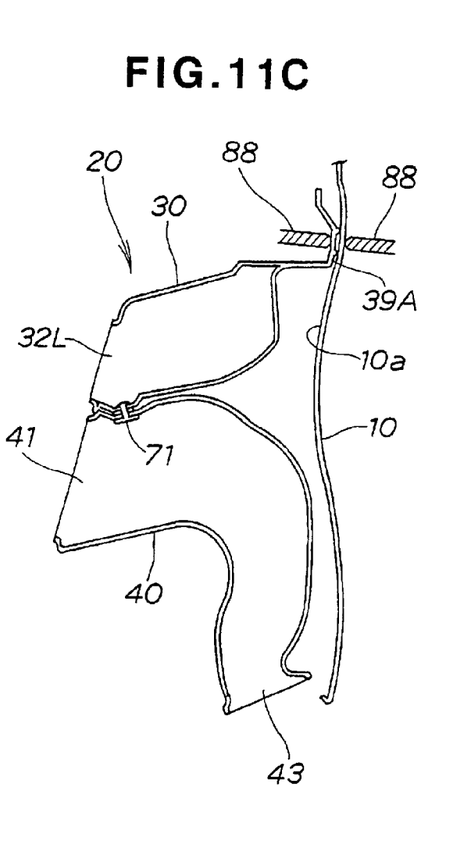

Lastly, as shown in FIG. 11C, mounting the leg portion 39A to the instrument panel 10 by the vibrating deposition technique (in a fourth step) completes an assembling work for the air conditioning duct 20. In particular, locating the air conditioning duct in a given position with respect to the rear surface 10a of the instrument panel 10 aligns the blowout opening 43 in a fixed place. In addition, placing the leg portion 39A onto the rear surface 10a of the instrument panel 10 allows an overlapped area to be pressed with a given pressing force by press dies 88, 88. Under such a condition, either the instrument panel 10 or the leg portion 39A is vibrated with a minute amplitude (of, for example, about 2 mm) at a given frequency (of, for example, about 100 Hz). A vibrating direction is aligned, for example, in a front and rear direction with respect to the drawing. The presence of frictional heat caused by the vibration allows the instrument panel 10 and the leg portion 39A to be deposited to one another. Thus, the leg portion 39A is deposited to the instrument panel 10 by the vibrating deposition.

With such a manner, the method for mounting the air conditioning duct of the present invention allows the plurality of cylindrical members to be individually formed and then allows the respective cylindrical members to be unitarily joined with the plural fixture members to for the air conditioning duct 20, thereby permitting the air conditioning duct 20 in the unitary structure to be mounted to the instrument panel by the vibrating deposition.

For example, even in a case where the air conditioning duct 20 has a complicated structure which has a plurality of ventilating passageways in communication with the plural openings such as the air inlets 32L, 41 located in a neighboring relationship, it is possible to manufacture the air conditioning duct in an easy manner. Further, since the air conditioning duct 20 in the unitary structure can be mounted to the instrument panel 10 by merely carrying out the vibrating deposition, a mounting workability is highly improved.

Figure 12A:
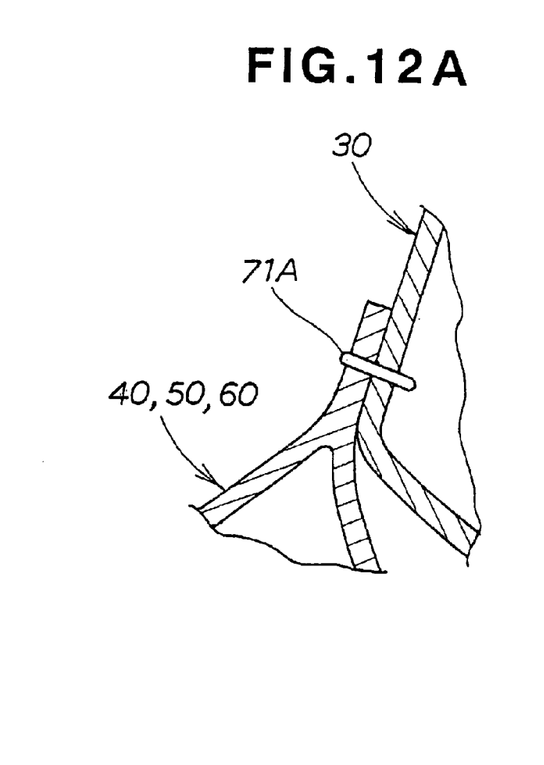
FIGS. 12A to 12C are views illustrating other examples of the cylindrical bodies mutually coupled to one another.
Figure 12B:
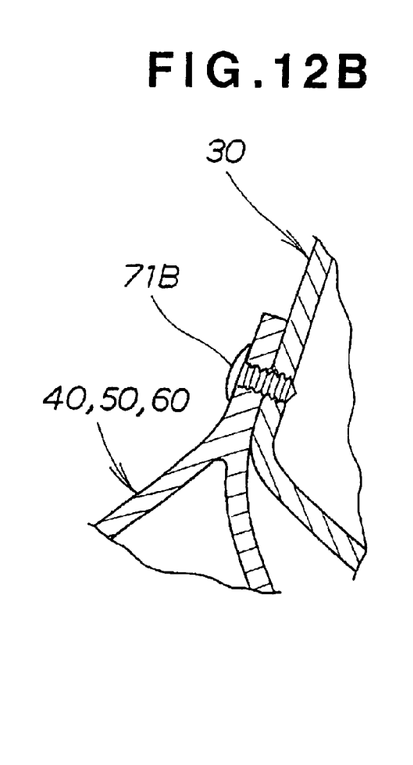
Figure 12C:
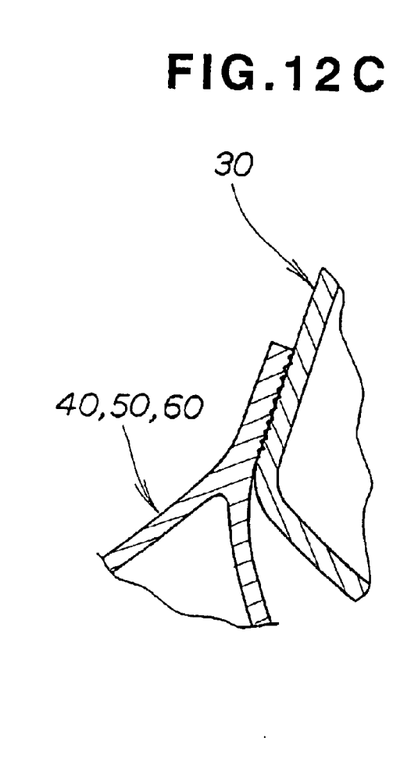

FIGS. 12A to 12C show other joined structures between the cylindrical members of the present invention.

The fixture member 71 for joining the cylindrical members 30 to 60 may be composed of a rivet, for example, a staple 71A shown in FIG. 12A, a screw 71B shown in FIG. 12B or a clip.

Also, the cylindrical members 30 to 60 may be directly joined by the vibrating deposition, an ultrasonic deposition or a hot caulking in a manner as shown in FIG. 12C in place of using the fixture member 71.

As will be apparent from the foregoing description, as shown in FIGS. 2 and 3, the present invention features the provision of the air conditioning duct 20 which includes the first cylindrical body composed of the cylindrical defroster member 30, and the second cylindrical body placed along the first cylindrical body and composed of the central cylindrical ventilating member 40 and the left and right cylindrical ventilating members 50, 60, the plurality of fixture members 71 (see FIG. 4) for joining the first and second cylindrical bodies 30 to 60, and the leg portions 39A to 39C, 45, 45, 55, 65 which extend from at least one of the first and second cylindrical bodies toward the instrument panel 10 shown in FIG. 1.

That is, the air conditioning duct 20 with the complicated structure is divided into the plural pieces of the cylindrical bodies 30 to 60. Joining these plural pieces of the cylindrical bodies 30 to 60 by the plural fixture members 71 allows one set of air conditioning duct 20 to be assembled into one piece. The leg portions 39A to 39C, 45, 45, 55, 65 of the air conditioning duct 20 with such a structure are enabled to extend toward the instrument panel 10 to be fixedly mounted thereon. Even if the air conditioning duct 20 has the complicated structure, the presence of the separate plural cylindrical bodies 30 to 60 which form the air conditioning duct allows the individual cylindrical bodies 30 to 60 to have simplified structures, respectively. Thus, the air conditioning duct 20 can be manufactured in an easy manner.

In addition, the presence of the first and second cylindrical bodies which are joined together in the unitary structure allows the air conditioning duct 20 to be fully maintained in an entire shape, while enhancing an adequate entire rigidity of the air conditioning duct 20. Accordingly, it is possible for the leg portions 39A to 39C, 45, 45, 55, 65 of the unitarily formed air conditioning duct 20 to be readily mounted to the instrument panel 10. Further, since the air conditioning duct 20 having the increased rigidity is mounted to the instrument panel 10, the instrument panel 10 also has an increased rigidity.

In the above preferred embodiment, the first cylindrical body and the second cylindrical body have a relative relationship with respect to one another. When the first cylindrical body is used as a reference, the second cylindrical body is placed along the first cylindrical body. In contrast, when the second cylindrical body is used as a reference, the first cylindrical body is placed along the second cylindrical body. Thus, it is arbitrarily possible for the first cylindrical body to be referred to as the second cylindrical body and for the second cylindrical body to be referred to as the first cylindrical body.

Furthermore, the aforementioned cylindrical members 30, 40, 50, 60 have relative relationships. Accordingly, either one of or two of the respective cylindrical members 30, 40, 50, 60 is arranged to serve as the first cylindrical body, while remaining cylindrical members serving as the second cylindrical body. For example, it is arbitrary for the cylindrical ventilating member 50 and the right cylindrical ventilating member 60 to be joined to the central cylindrical member 40 with the plural fixture members 71. Using the central cylindrical ventilating member 40 as the first cylindrical body and arranging the remaining cylindrical members 30, 50, 60 as the second cylindrical body may allow the second cylindrical body to be placed along the first cylindrical body for thereby joining the first and second cylindrical bodies together. Also, it is arbitrary for the number of pieces to be employed as the cylindrical members which constitute the first and second cylindrical bodies.

Further, the joining positions of the respective cylindrical members are selected such that the rigidity of the entire structure of the air conditioning duct 20 is ensured after the air conditioning duct 20 is assembled with the cylindrical members 30 to 60 whereupon, after the air conditioning duct 20 is mounted to the instrument panel 10, an entire rigidity of the air conditioning duct 20 is enhanced.

In addition, it is arbitrary for the leg portions 39A, 39B, 39C, 45, 45, 55, 65 to have any shapes, dimension or the number of pieces or for the mounting surfaces, to which the leg portions are to be mounted, to have any shape, dimension or the number of pieces.

Further still, the outlets of the air blowout tubes (the air blowout openings) 36L, 36R, 37L, 37R, 38L, 38R, 43, 54, 64 may have the bell-mouthed shapes, respectively, so as to be mated with the air discharge pipes 75 mounted to the instrument panel 10. The bell-mouthed shape may include a tapered shape, a funnel-shaped profile and a bell-shape.

Industrial Applicability

As noted above, an air conditioning duct of the present invention allows an air conditioning duct with a complicated configuration to be formed with a plurality of cylindrical members which are separately formed. Since the plural cylindrical members are joined together with a plurality of fixture members, each cylindrical member has a relatively simplified structure, providing an ease of manufacturing the air conditioning duct with the complicated shape in a simple fashion to be useful from the point of productivity of a vehicle and from a reduced cost.

What is claimed is:

1. An air conditioning duct mounted on a rear surface of a vehicular instrument panel, said air conditioning duct comprising:

a blow-molded first cylindrical duct member having a plurality of flat connecting portions formed alone a lengthwise direction thereof;

a blow-molded second cylindrical duct member having a plurality of flat connecting portions formed along a lengthwise direction thereof, the second cylindrical duct member being disposed along said blow-molded first cylindrical duct member with the flat connecting portions of the first cylindrical duct member and the flat connecting portions of the second cylindrical duct member overlapped with each other;

a plurality of fastener members for joining together said first and second cylindrical duct members at the respective overlapped flat connecting portions to thereby complete an air conditioning duct; and a plurality of leg portions extending from at least one of said first and second cylindrical duct members toward said vehicular instrument panel and joined with the vehicular instrument panel by vibration welding to thereby mount the air conditioning duct to the vehicular instrument panel.

2. The air conditioning duct according to claim 1, wherein at least one of said fastener members is located in the vicinity of openings of said first and second cylindrical duct members.

3. The air conditioning duct according to claim 1, wherein said first and second cylindrical duct members include respective air blowout tubes extending toward said vehicular instrument panel, said air blowout tubes have outlets formed in bell-mouthed shapes so as to mate with air discharge pipes mounted to said vehicular instrument panel.

4. The air conditioning duct according to claim 1, wherein each of said leg portions has a mounting surface formed with a plurality of projections.

5. A method for mounting an air conditioning duct on a vehicular instrument panel, comprising the steps of:

preparing by blow-molding a first cylindrical duct member and a second cylindrical duct member, separately, each of said blow-molded first and second cylindrical duct members having a plurality of flat connecting portions formed along a lengthwise direction thereof, and at least one of the first and second cylindrical duct members having a plurality of leg portions;

placing said first cylindrical duct member and said second cylindrical duct member along one another with the flat connecting portions of the first cylindrical duct member and the flat connecting portions of the second cylindrical duct member overlapped with each other and joining said first and second cylindrical duct members at the respective overlapped connecting portions by a plurality of fastener members to thereby complete an air conditioning duct; and joining said respective leg portions with said vehicular instrument panel by vibration welding to thereby mount the air conditioning duct to the vehicular instrument panel.

6. A method according to claim 5, wherein the first and second cylindrical duct members include respective air blowout tubes extending toward the vehicular instrument panel and having outlets formed in bell-mouthed shapes for mating engagement with air discharge pipes mounted to the vehicular instrument panel, and each of the bell-mouthed shape outlets is formed by cutting off an undesired part of a respective one of the blow-molded first and second cylindrical duct members.

* * * * *